United States Patent
Maligne et al.

(10) Patent No.: US 6,899,011 B2
(45) Date of Patent: May 31, 2005

(54) PNEUMATIC BOOSTER COMPRISING TUBULAR INTAKE AND EQUALIZING VALVES

(75) Inventors: Jean-Charles Maligne, Aubervilliers (FR); Stéphane Lacroix, Tournan en Brie (FR); Philippe Richard, Chelles (FR); Ulysse Verbo, Aulnay-sous-Bois (FR)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 10/425,850

(22) Filed: Apr. 29, 2003

(65) Prior Publication Data

US 2004/0012255 A1 Jan. 22, 2004

(30) Foreign Application Priority Data

May 7, 2002 (FR) .............................. 02 05770

(51) Int. Cl.$^7$ ................................. F15B 9/10
(52) U.S. Cl. ..................... 91/369.3; 91/376 R
(58) Field of Search ................ 91/369.2, 369.3, 91/376 R

(56) References Cited

U.S. PATENT DOCUMENTS 5,161,451 A * 11/1992 Fecher .................... 91/376 R
5,579,675 A * 12/1996 Gautier et al. ............ 91/376 R
5,609,087 A * 3/1997 Horikoshi ................ 91/376 R

* cited by examiner

Primary Examiner—F. Daniel Lopez
(74) Attorney, Agent, or Firm—Leo H. McCormick, Jr.; Warren Comstock

(57) ABSTRACT

A pneumatic brake booster for a motor vehicle, of the type in which the movements of a control rod (38) are able to determine the openings and closings of at least one axial intake valve (52) which is inserted between a pressure source subjected to the pressure ($P_a$) higher than the first pressure ($P_1$) and a rear chamber (18) of the booster, and of at least one axial equalizing valve (50) which is inserted between a front chamber (16) and the rear chamber (18), to actuate a moving partition (14) inserted between the front chamber (16) and the rear chamber (18), characterized in that it comprises a tubular element (76) of which axially offset transverse faces (78, 80) comprise first elements (82, 84) for sealing the axial intake and equalizing valves (50, 52) and that the control rod (38) is able to operate via two concentric springs (40, 122) having different stiffnesses.

9 Claims, 7 Drawing Sheets

PNEUMATIC BOOSTER COMPRISING TUBULAR INTAKE AND EQUALIZING VALVES

The invention relates to a pneumatic brake booster for a motor vehicle.

BACKGROUND OF THE INVENTION

The invention relates more particularly to a pneumatic brake booster for a motor vehicle, of the type comprising a rigid casing inside which there can move a transverse partition sealingly delimiting a front chamber, subjected to a first pressure, and a rear chamber subjected to a second pressure that varies between the first pressure and a pressure higher than the first pressure, which is able to act on an actuating rod of a master cylinder associated with the booster by way of a reaction disk, and which is elastically returned toward its rest position by first return means, of the type which comprises a control rod moving in the casing selectively according to an axial input force exerted forward against the action of a return force exerted on the rod via second return means, of the type in which the movements of the control rod are able to determine the openings and closings of at least one axial intake valve which is inserted between a pressure source subjected to the pressure higher than the first pressure and the rear chamber, and of at least one axial equalizing valve which is inserted between the front chamber and the rear chamber, to actuate the moving partition, and of the type in which a plunger, passing through the moving partition and secured to the end of the control rod, is able to act directly upon the actuating rod of the master cylinder by way of the reaction disk.

Numerous examples of conventional boosters of this type are known.

In such a booster, the piston is secured to the moving wall. It is, for example, fitted through the moving partition. Furthermore, the equalizing valve and the intake valve form part of a single three-way valve a common seat of which is formed of a stepped front face of a moving element which is elastically returned against a flange of the plunger and against a flange of the piston from which flanges it can be selectively separated in order to open the equalizing valve or the intake valve.

Thus, a roughly radial duct which passes through the piston and which opens into the front chamber, on the one hand, and a roughly axial duct which opens to the outside of the booster, on the other, can be placed selectively in communication by way of a valve associated with a radial duct which passes through the piston and which opens into the rear chamber in order to maintain or cancel a pressure difference between the rear chambers and cause the moving partition to move.

Such a design has the disadvantage of entailing ducts made in the piston with complex shapes, which disturb the air flow. As a result, a booster generally has relatively high response times and proves noisy.

Furthermore, such a design is particularly expensive to implement because it entails the use of a piston whose interior shapes, intended to form the ducts, can be produced only by a machining method.

SUMMARY OF THE INVENTION

The invention proposes a design which allows these disadvantages to be remedied. For that purpose, such a design proposes a booster without a piston, which comprises axial ducts forming part of various tubular elements internal to the booster. This design encourages the air to flow through the valves, and this makes it possible to reduce the booster response times while at the same time giving it quiet operation. What is more, this new design allows most of the booster elements to be made using a pressing method which is less expensive than the conventional machining methods.

To this end, the invention proposes a booster of the aforementioned type, characterized in that said booster comprises:

a floating tubular element made in one piece, inserted more or less radially between the plunger and the casing, which is axially mobile and which is elastically returned toward the moving partition via third return means, of which axially offset transverse faces have first sealing elements for the axial intake and equalizing valves;

a complementary transverse second sealing element for the axial intake valve, borne by the rear end of the plunger;

a complementary transverse second sealing element for the axial equalizing valve, placed on at least one portion of the rear face of the moving partition; and in that the rear end of the plunger comprises a rear cup which comprises the complementary transverse second sealing element for the axial intake valve and in that the said rear end of the plunger has, passing through it, an independent front pin which has the ends of two concentric springs bearing against it, of which springs a first, the other end of which bears against the moving partition, forms the second return means associated with the control rod, and the second, of which the other end bears against a stepped face of the tubular element, forms the third return means associated with the said tubular element and allows it to be urged to close the equalizing valve.

According to other features of the invention the floating tubular element comprises:

a front tubular section, which is mounted with sealing around a tubular bearing surface of the moving partition which slideably houses the plunger, of which the front end, bearing the first sealing element for the equalizing valve, facing the second sealing element for the equalizing valve borne by the moving partition, is arranged radially externally with respect to at least one communication drilling passing through the partition, and of which a rear part communicates with the rear chamber;

a rear tubular section, of a diameter smaller than the diameter of the front section, which is slideably guided with sealing in a rear tubular section of the casing, which forms an intake duct fed by the source of pressure subjected to the pressure greater than the first pressure and of which a front transverse face for connection with the front section bears the first sealing element for the intake valve facing the cup of the plunger;

the first sealing element for the equalizing valve consists of a seal borne by a flange formed at the end of the front section of the floating tubular element;

the second sealing element for the equalizing valve consists of a portion of the rear face of the moving partition;

the first sealing element for the intake valve consists of the transverse face connecting the front and rear portions of the floating tubular element;

the second sealing element for the intake valve consists of a seal borne by a flange of the cup secured to the plunger;

the tubular bearing surface for guidance of the plunger, which surface is borne by the moving partition, extends axially from the rear face of the moving partition and the moving partition comprises a plurality of drillings distributed angularly across the transverse partition about the site where its tubular bearing surface meets its rear face;

the first spring is arranged externally with respect to the second spring;

the pin has the rear end of a tubular bushing for holding the first and second springs bearing against it, the first spring is inserted between a front stepped face of the bushing and the moving partition, and the second spring is inserted between a front end face of the tubular bushing and a stepped transverse face of the tubular element, particularly a rear face of the front end flange of the front section;

the rear section of the tubular element is mounted with sealing in the rear section of the casing via a lip seal;

the tubular bearing surface of the moving partition which houses the plunger is formed integrally with the said moving partition, and it has a bore in which the plunger is housed and which opens opposite the reaction disk; and the moving partition, the floating tubular element, the cup secured to the plunger are produced using cutting and pressing methods.

Other features and advantages of the invention will become apparent from reading the detailed description which follows, for an understanding of which reference will be made to the appended drawings.

DETAILED DESCRIPTION OF THE DRAWINGS

Figure 1:
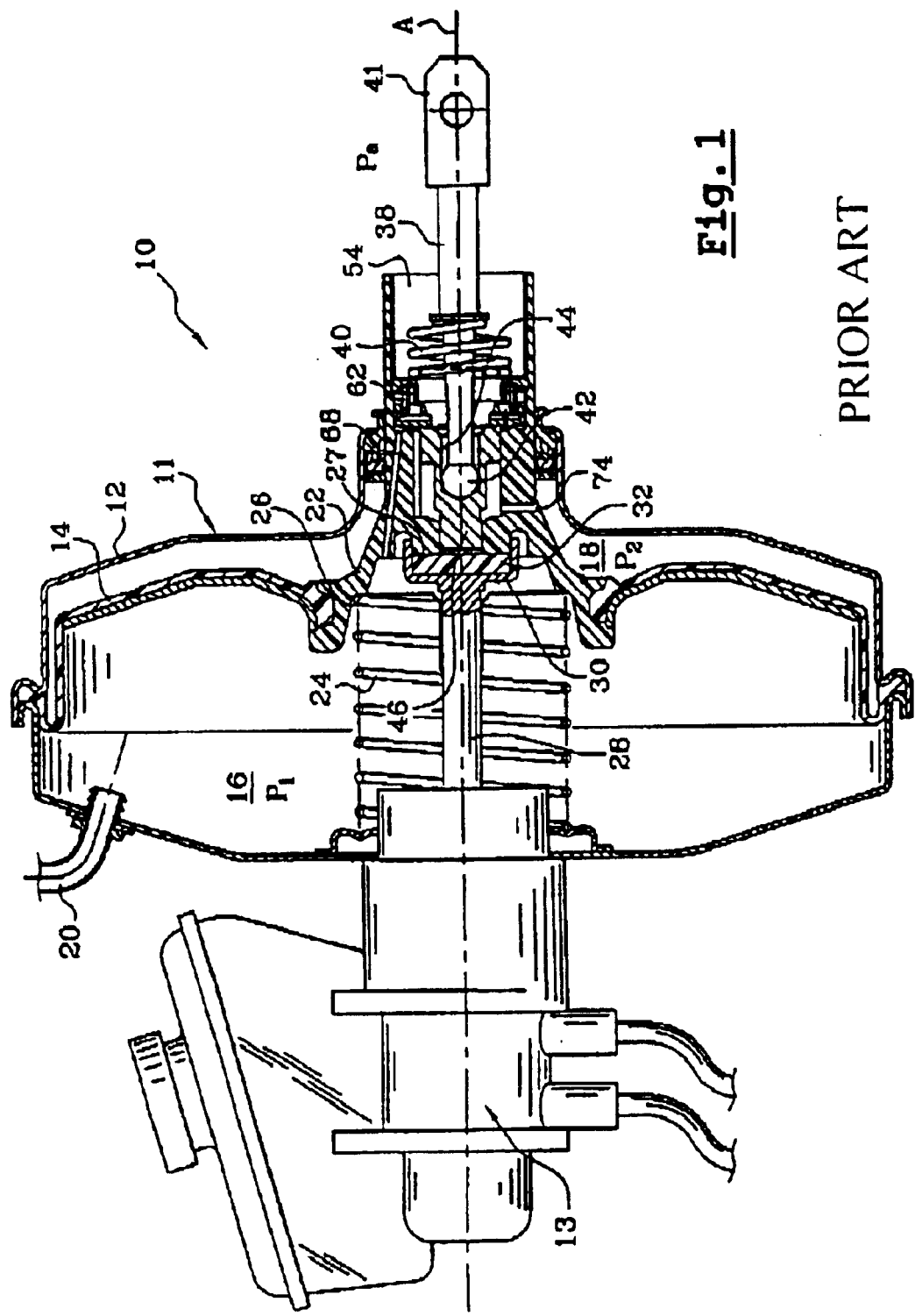
FIG. 1 is an overall view of an axial section of a boosted brake comprising a pneumatic brake booster produced according to the prior art.

In the description which will follow, identical reference numerals denote parts which are identical or have similar functions.

By convention, the terms "front", "rear", "upper" and "lower" refer respectively to elements or positions facing the left, the right, the top or bottom respectively of FIGS. 1 to 7.

FIG. 1 depicts the entirety of a boosted brake 10 comprising a conventional pneumatic brake booster 11 for a motor vehicle. The booster 11 is intended to actuate a master cylinder 13 concerned with braking the vehicle.

In a known way, the pneumatic booster 11 comprises a rigid casing 12 inside which is movably mounted a transverse partition 14 which sealingly delimits a front chamber 16, subjected to a first pressure "$P_1$", and a rear chamber 18 subjected to a second pressure "$P_2$". The second pressure "$P_2$" is able to vary between the value of the pressure "$P_1$" and the value of a pressure "$P_a$" higher than the pressure "$P_1$" so as to cause movements of the partition 14 which is able, as will be seen later, to act upon an actuating rod 28 of the master cylinder 13.

More particularly, the pressure "$P_1$" corresponds in particular to a pressure supplied by a vacuum source of the vehicle. In the case of a controlled-ignition engine, the vacuum pressure "$P_1$" is supplied, for example by a vehicle engine inlet manifold and, in the case of a compression-ignition engine of diesel type, the vacuum pressure "$P_1$" is, for example, supplied by a vehicle vacuum pump.

The front chamber 16 is connected to the vacuum source of the vehicle via a vacuum pipe 20 which opens into the casing 12.

The pneumatic booster 11 comprises a moving piston 22 of axis A which is secured to the moving partition 14. For example, the moving piston 22 is fitted through the moving partition 14.

Inside the casing 12, the moving partition 14 is returned elastically backward by first return means consisting of a return spring 24 which bears against the casing 12 and against a front face 26 of the moving piston 22. The front face 26 of the moving piston 22 has a front cylindrical bearing surface 27 which is arranged facing a reaction disk 32 which is housed in a cup 30 secured to the actuating rod 28 of the master cylinder 13.

A control rod 38 which, for example, is connected to a vehicle brake pedal via a coupling sleeve 41, can move in the casing 12, and, more particularly, in the moving piston 22, selectively according to an axial input force exerted forward on the sleeve 41. The actuating force is exerted against the action of a return force produced on the rod 38 by second return means, notably a return spring 40 which is inserted between the moving piston 22 and the control rod 38.

The front end of the control rod 38 which is the opposite end to the sleeve 41 is shaped as a ball 42 and is housed in a complementary housing 44 belonging to a roughly cylindrical plunger 46 which is slideably mounted in the moving piston 22.

Figure 2:
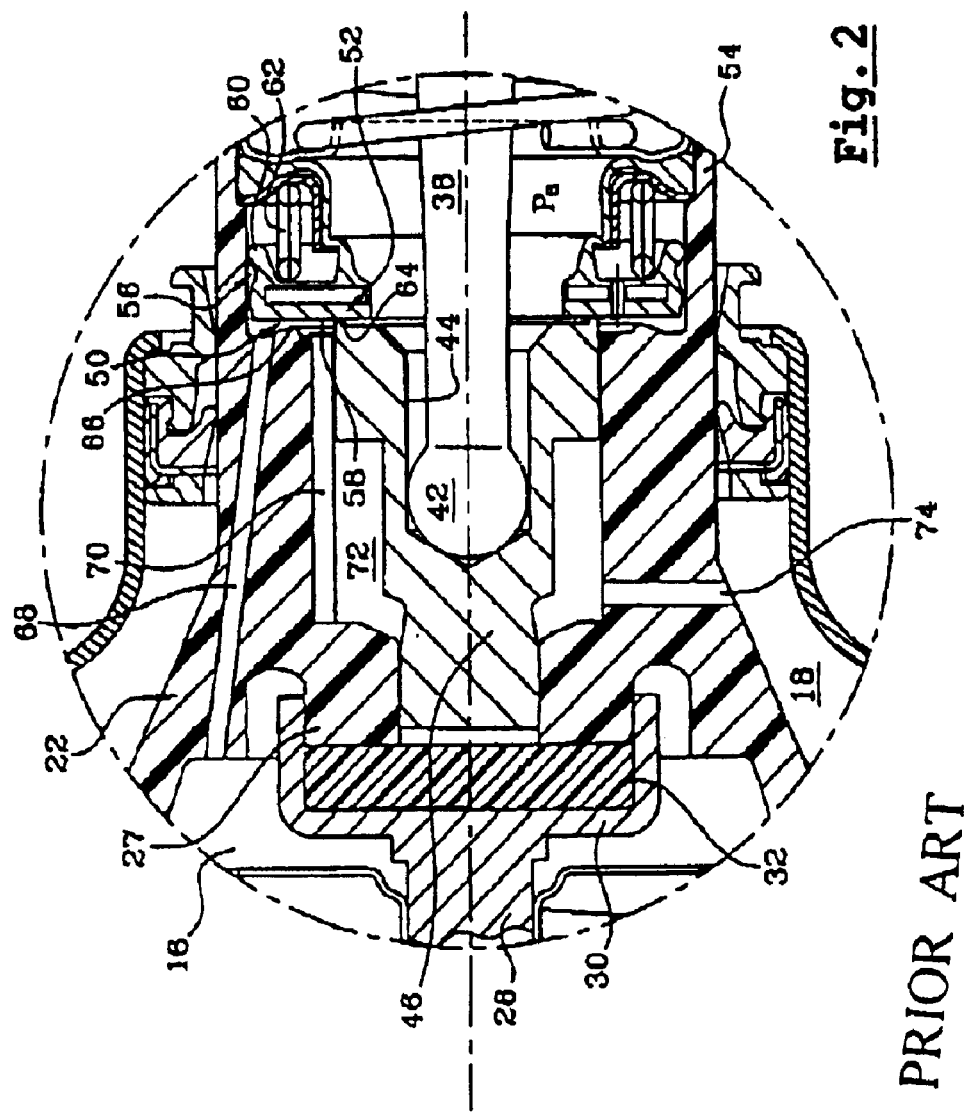
FIG. 2 is a detailed view of the booster of FIG. 1.
Figure 3:
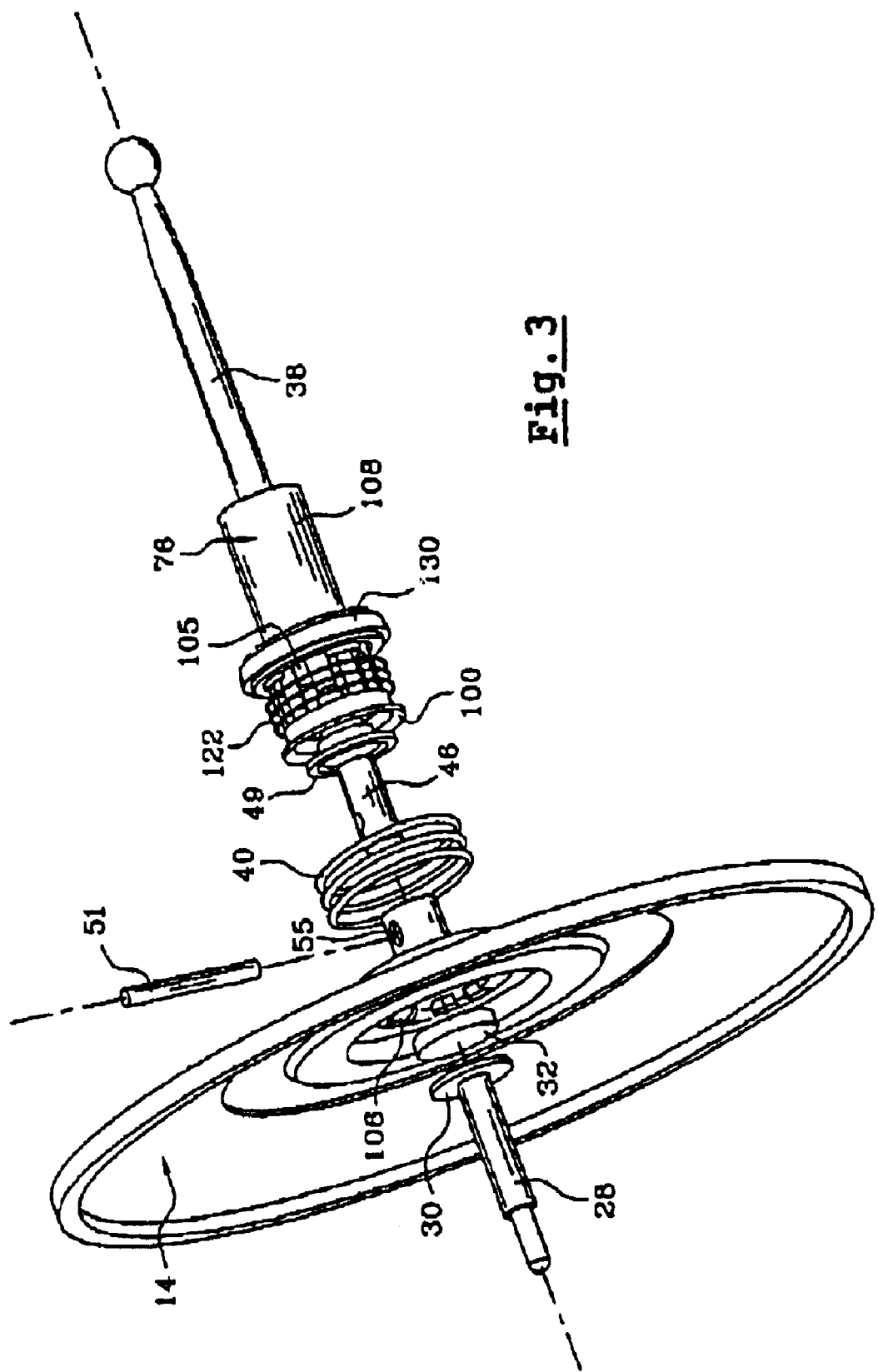
FIG. 3 is a perspective view of the elements internal to the casing of a booster according to the invention.

As illustrated more particularly in FIG. 2, the movements of the control rod 38 are able to determine the openings and closings of at least one axial intake valve 52 which is inserted between a pressure source subjected to the pressure "$P_a$" higher than the first pressure "$P_1$" and the rear chamber 18, and of at least one axial equalizing valve 50 which is inserted between the front chamber 16 and the rear chamber 18, to actuate the aforementioned moving partition.

In a known way, and in a way which does not restrict the invention, the pressure source subjected to the pressure "$P_a$" corresponds to the ambient atmospheric environment. For this purpose the valve 52 opens directly into a rear end 54 of the body of the piston 22 forming an axial duct which is open to the open air.

In the conventional way, the equalizing valve 50 and the intake valve 52 form part of a single three-way valve 56 a common seat 58 of which consists of a stepped front face of a moving annular element 60 which is returned elastically by a spring 62 against a flange 64 on the plunger 46 and against a flange 66 on the piston 22.

Thus, a roughly radial duct 68 which passes through the piston 22 and which opens into the front chamber 16, or alternatively the roughly axial duct 54 which opens to the outside of the booster 11, can be placed selectively in communication, by way of a plunger guide bore 72 and of a groove 70 made in this bore, with a radial duct 74 which passes through the piston 22 and opens into the rear chamber 18 to maintain or cancel a pressure difference between the front 16 and rear 18 chambers and thus cause the moving partition 14 to move.

The intake 52 and equalizing 50 valves are returned elastically to a position in which the intake valve 52 is closed and the equalizing valve 50 is opened by the second return means consisting of the spring 40 of the control rod 38.

Such a design is particularly expensive to implement because it entails the use of a piston of which the interior shapes, intended to form the ducts 68 and 74, have to be produced using a machining method or by a casting method where the ducts are obtained using radial slides.

To remedy this disadvantage, the invention proposes a booster 11 of the type described previously in which the intake and equalizing ducts are formed in tubular elements of the booster 11.

For this, as illustrated in FIGS. 3 to 7, the booster 11 has no piston and comprises:

a floating tubular element 76 made in one piece, inserted more or less radially between the plunger 46 and the casing 12, which is axially mobile and which is elastically returned toward the moving partition 14 via third return means, of which axially offset transverse faces 78, 80 have first sealing elements 82, 84 for the axial intake and equalizing valves 52, 50;

a complementary transverse second sealing element 86 for the axial intake valve 52, borne by the rear end 45 of the plunger 46; and a complementary transverse second sealing element 88 for the axial equalizing valve 50, placed on at least one portion of the rear face 90 of the moving partition 14.

Furthermore, the rear end 45 of the plunger 46 comprises a rear cup 49 which comprises the complementary transverse second sealing element 86 for the axial intake valve 52 and has, passing through it, an independent front pin 51 which has the ends 41, 123 of two concentric springs 40, 122 bearing against it, of which springs a first 40, of high stiffness and the other end 39 of which bears against the moving partition 14, forms the second return means associated with the control rod 38, and the second spring 122, of low stiffness and of which the other end 39 bears against a stepped face of the tubular element 76, forms the third return means associated with the said tubular element 76 and allows it to be urged to close the equalizing valve 50.

According to the invention, the floating tubular element 76 comprises a front tubular section 100, which is mounted with sealing around a tubular bearing surface 98 of the moving partition 14 which slideably houses the plunger 46.

The front end 102 of the front section 100 comprises the transverse front face 80 bearing the first sealing element 84 for the equalizing valve 50, facing the second sealing element 88 for the equalizing valve 50 borne by the rear face 90 of the moving partition 14. The end 102 of the front section 100 is arranged radially externally with respect to at least one communication drillng 106 passing through the partition 14, and a rear part of the front tubular section 100, arranged behind the sealing means which allow it to slide with sealing around the tubular bearing portion 98, communicates with the rear chamber 18 via longitudinal slots 105.

According to the invention, the floating tubular element 76 also comprises a rear tubular section 108, of a diameter smaller than the diameter of the front section 100, which is guided to slide with sealing in a rear tubular section 109 of the casing 12.

In particular, the rear tubular section 108 is mounted to slide through a lip seal 113 borne by the rear tubular section 109 of the casing 12.

Figure 4:
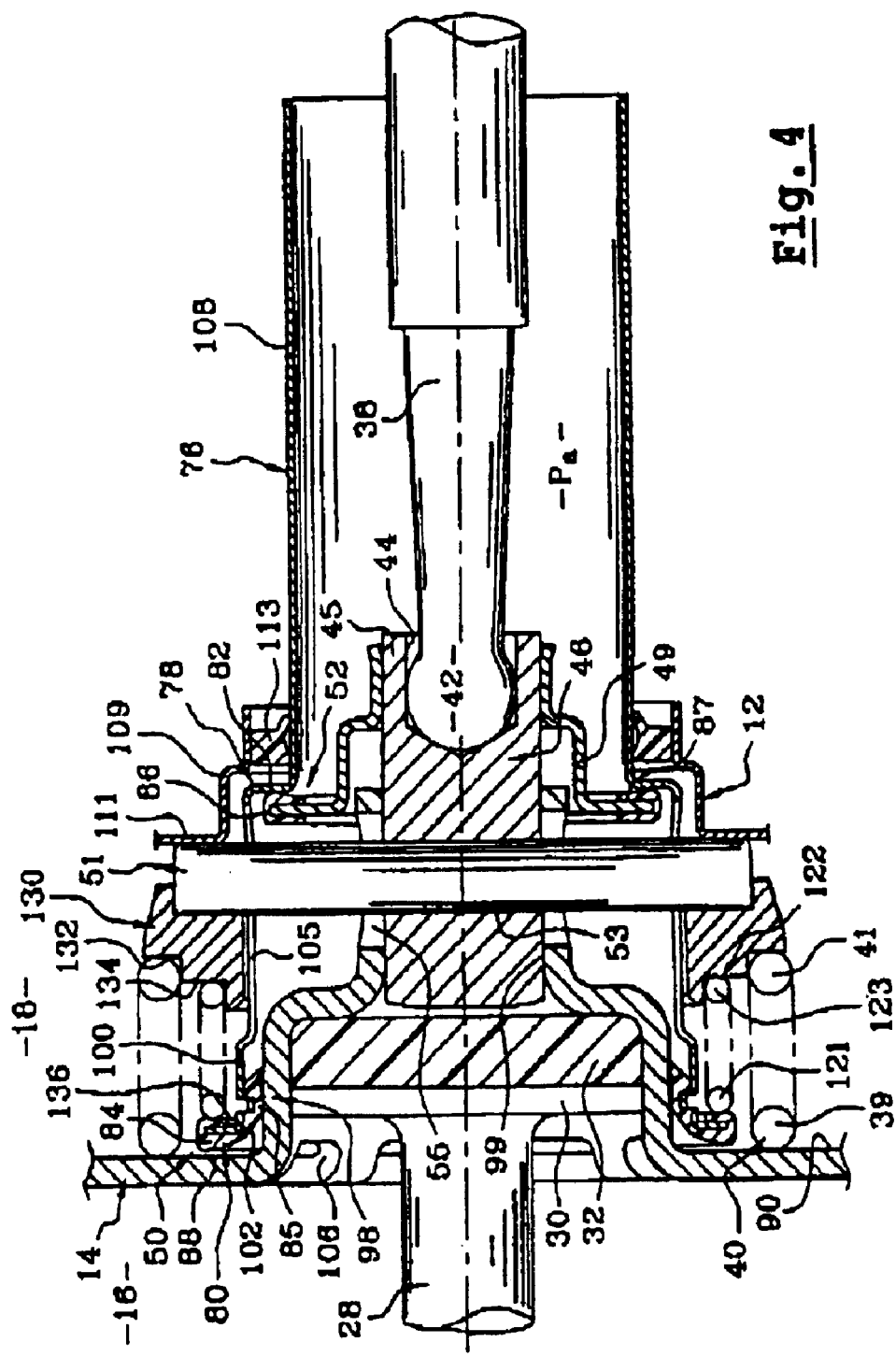
FIG. 4 is a detailed view in axial section of a booster produced according to the invention, the plunger being at rest, the equalizing valve being open and the intake valve being closed.

Advantageously, the rear tubular section 109 of the casing 12 comprises at least one stepped annular face 111 which is intended to house the ends of the pin 51 in abutment against it so as to keep the plunger 46 and the control rod 38 in their rest positions, as depicted more specifically in FIG. 4.

The pin 51 is housed in a drilling 53 which passes diametrically through the plunger 46. It also passes through diametrically opposed slots 55 in the tubular bearing surface 98 which slideably houses the plunger 46, and the longitudinal slots 105 of the tubular element 76.

The rear tubular section 108 forms an intake duct fed by the source of pressure subjected to the pressure "$P_a$" higher than the first pressure "$P_1$".

A front transverse face 78 connecting the rear section 108 and the front section 100 bears the first sealing element 82 for the intake valve 52 facing the cup 49 of the plunger.

More specifically, the first sealing element 82 for the intake valve 52 consists simply of the transverse face 78 connecting the front 100 and rear 108 sections of the floating tubular element 76, and the second sealing element 86 for the intake valve 52 consists of a seal which is borne by a flange 87 of the cup 49 secured to the plunger 46. As a preference, the seal 86 is mounted astride the flange 87 of the plunger 49.

Furthermore, the first sealing element 84 for the equalizing valve 50 consists of a seal which is borne by a flange formed at the end 102 of the front section 100 of the floating tubular element 76, and the second sealing element 88 for the equalizing valve 50 consists of a portion of the rear face 90 of the moving partition 14. As a preference, the seal 84 is mounted astride the flange forming the end 102 of the front section 100 of the tubular element 76.

These arrangements do not in any way restrict the invention, and the seals could be borne respectively by the transverse face 78 connecting the front 100 and rear 108 sections and by the rear face 90 of the moving partition 14.

The tubular bearing surface 98 for guidance of the plunger 46 is borne by the moving partition 14 of which it preferably forms an integral part, and it extends axially from the rear face 90 of the moving partition 14. It comprises a bore 99 in which the plunger 46 is slideably mounted and which opens opposite the reaction disk 32 to allow the plunger 46 to act on the said reaction disk 32.

In this configuration, the front section 100 slides with sealing over the said tubular bearing surface 98 via a lip 85 of the seal 84. To allow the equalizing valve 50 to interrupt or to allow the communication between the front chamber 16 and the rear chamber 18, the moving partition 14 has a number of drillings 106 distributed angularly across the transverse partition 14 around the site where its tubular bearing surface 98 and its rear face 90 meet.

In the preferred embodiment of the invention, the first spring 40, with the highest spring load, is arranged externally with respect to the second spring 122, with the smallest spring load.

To allow this setup, the free end of the pin 51 has the rear end of a tubular bushing 130 for holding the first and second springs 40, 122 bearing against it. The first spring 40 is inserted between a front stepped face 132 of the bushing 130 and the moving partition 14, and the second spring 122 is inserted between a front end face 134 of the tubular bushing 130 and a stepped transverse face of the tubular element, particularly a rear face 136 of the front end flange 102 of the front section 100.

One particular advantage of the invention is that the moving partition 14, the floating tubular element 76, the cup 49 secured to the plunger 46 are preferably made by cutting and pressing methods. This configuration is particularly advantageous because it allows the booster 11 to be produced more quickly.

Furthermore, the moving partition 14 and the tubular element 76 having simple tubular shapes, this design encourages air to flow through the valves 50 and 52, making it possible to reduce the response time of the booster 11 while at the same time guaranteeing that it will operate noiselessly.

In this configuration, the internal elements of the booster 11 are able to occupy four different configurations which have been depicted in FIGS. 4 to 7.

As illustrated in FIG. 4, the control rod 38 is able to occupy a rest position. In this position, the air intake valve 52 is closed and the equalizing valve 50 is opened, so that the front 16 and rear 18 chambers are subjected to the same depression pressure "$P_1$". The partition 14 is therefore immobile. The control rod 38 and the plunger 46 are held in their rest position by the pin 51 which bears against the transverse annular face 111 of the casing 12.

Figure 5:
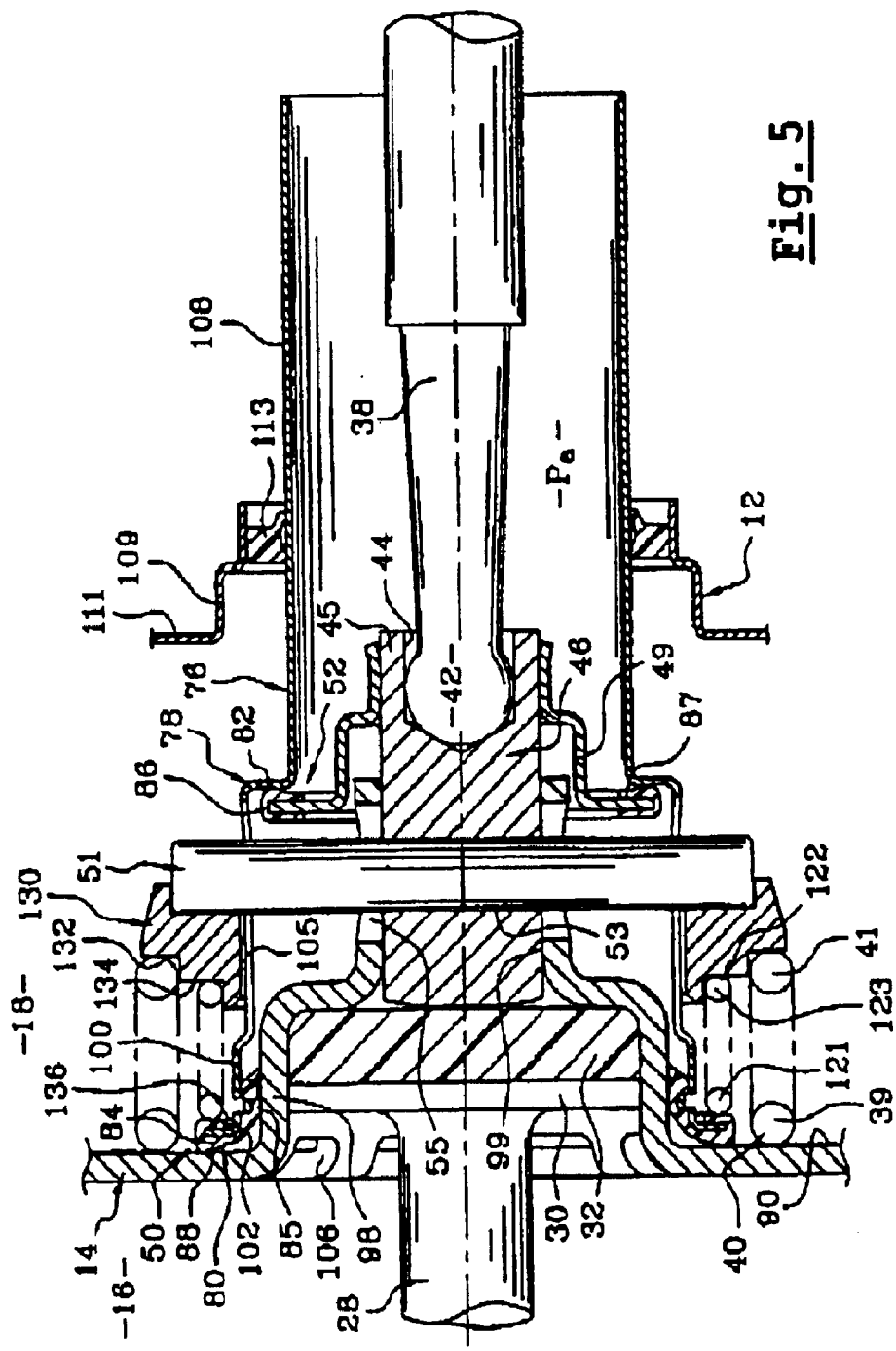
FIG. 5 is a detailed view in axial section of a booster according to the invention, the plunger being actuated and the equalizing valve and the intake valve being closed.

Starting out from this position, a forward movement of the control rod 38 gives rise to a forward movement of the plunger 46 and of the pin 51 connected to it, as depicted in FIG. 5. The pin 51 pushes back the tubular bushing 130 that holds the first and second springs 40, 122. The first spring 40 compresses while the tubular bushing 130 drives the tubular element 76 via the spring 122 until the seal 84 comes into contact with the part of the rear face 90 of the partition 14, this causing the equalizing valve 50 to close, as depicted in FIG. 5.

Figure 6:
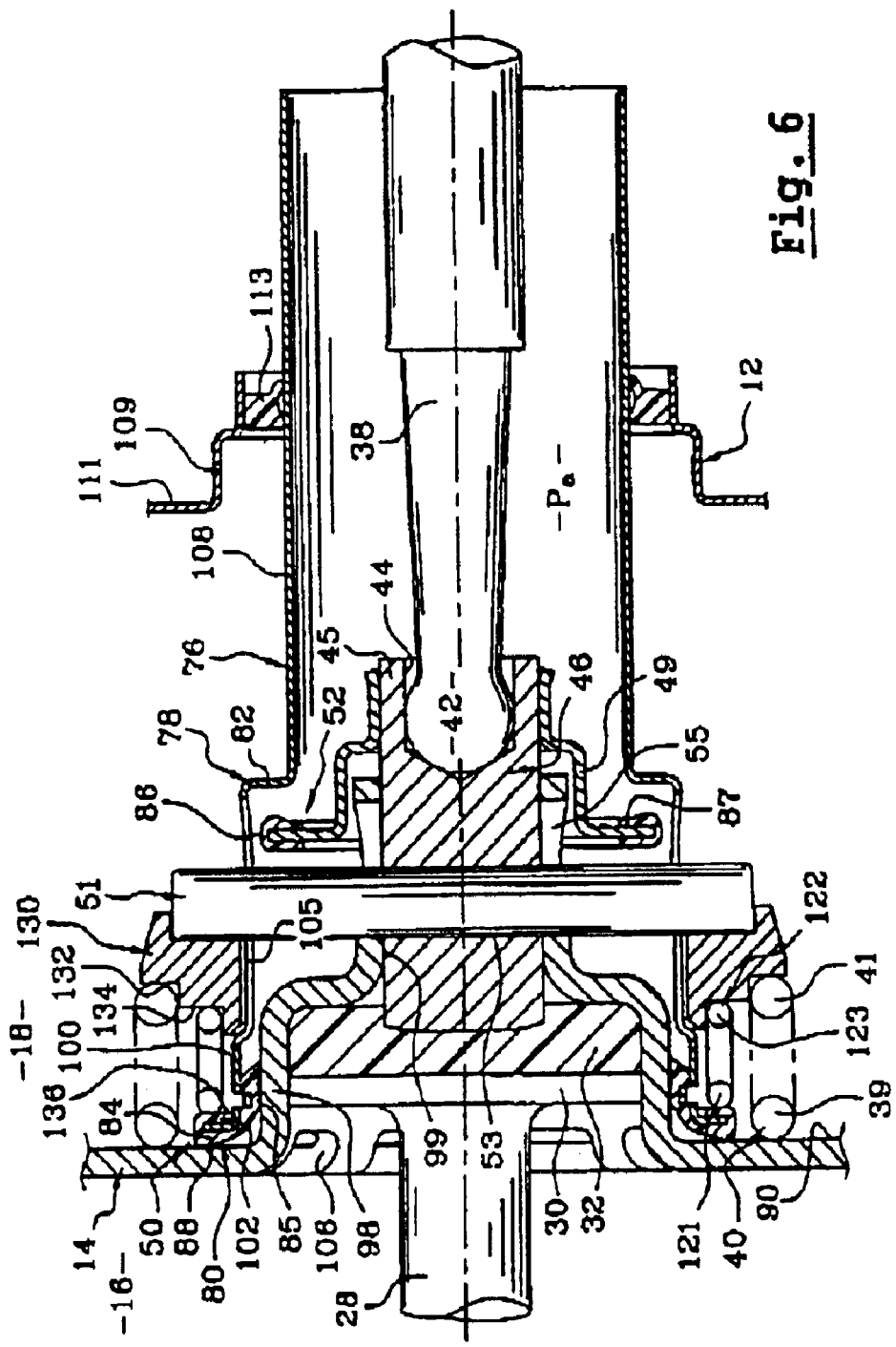
FIG. 6 is a detailed view in axial section of a booster produced according to the invention, the plunger being actuated, the equalizing valve being closed and the intake valve being open.

As it continues to advance, the control rod then compresses the spring 122 via the tubular bushing 130, and this spring causes the cup 49 and the associated seal 86 to detach from the transverse face 78 connecting the front 100 and rear 108 sections of the element 76 forming the first sealing element 82 for the intake valve 52, as depicted in FIG. 6. Air at atmospheric pressure enters the rear chamber 18 and pushes the moving partition 14 back.

Figure 7:
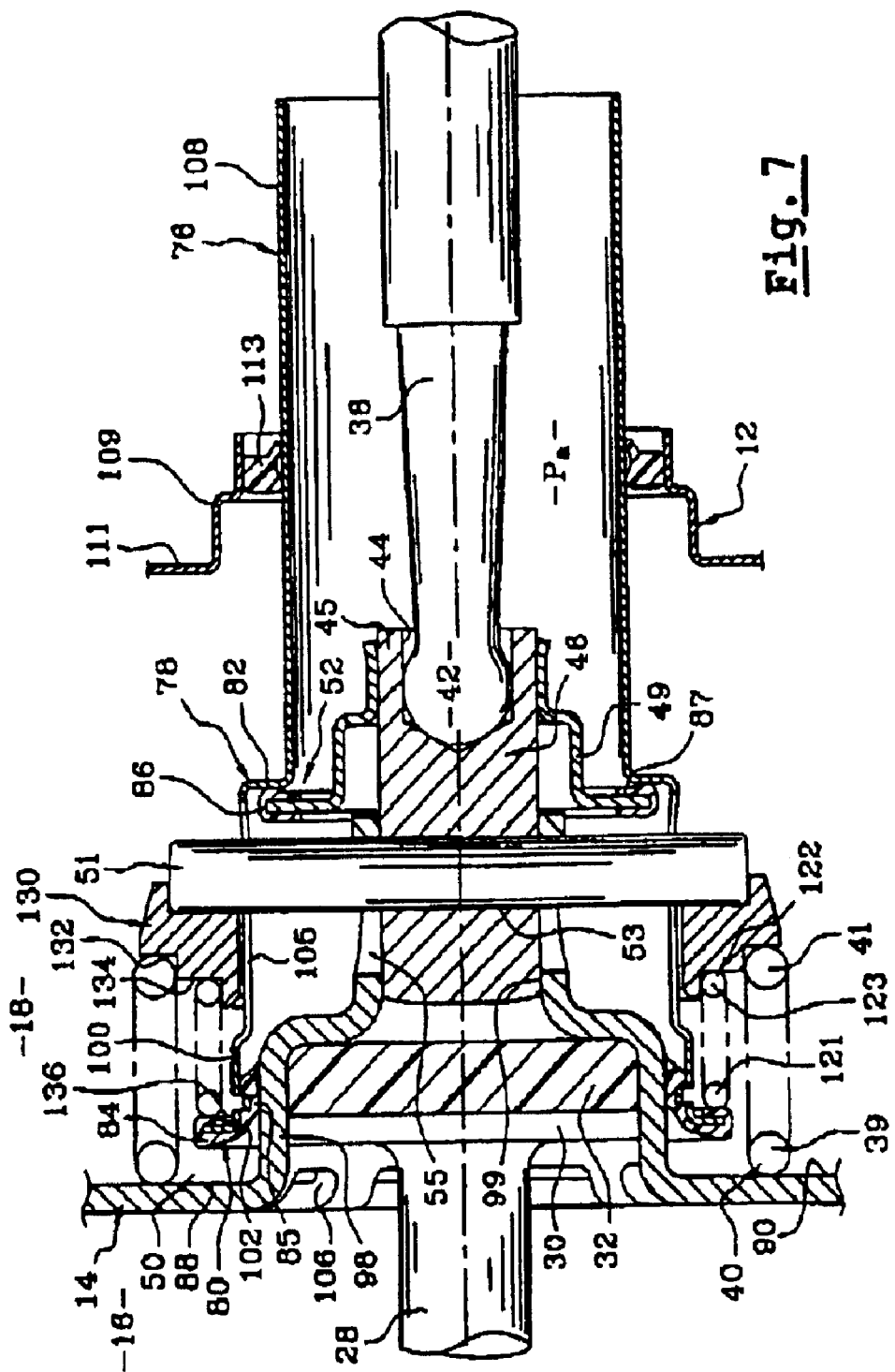
FIG. 7 is a detailed view in axial section of a booster produced according to the invention, the plunger being released, the equalizing valve having reopened and the intake valve having closed again.

If the control rod 38 is released, as depicted in FIG. 7, the decompression of the first spring 40 causes the said control rod 38 to return to its rest position. As it returns, the plunger 46 causes the cup 49 to come back into contact with the transverse face 78 where the front 100 and rear 108 sections of the element 76 meet, and this closes the intake valve 52 again and then causes the tubular element 76 to return, and thus causes the equalizing valve 50 to reopen. As a result, the air at atmospheric pressure "Pa" contained in the rear pressure chamber 18 is discharged into the front pressure chamber 14 subjected to the depression pressure "$P_1$".

The invention therefore provides the benefit of a booster which enjoys a shorter response time and particularly quiet operation and which in addition calls largely upon a pressed tubular design, simplifying its manufacture.

We claim:

1. A pneumatic brake booster (11) for a motor vehicle,
of the type comprising a rigid casing (12) inside which there can move a transverse partition (14) sealingly delimiting a front chamber (16), subjected to a first pressure ($P_1$), and a rear chamber (18) subjected to a second pressure ($P_2$) that varies between the first pressure ($P_1$) and a pressure ($P_a$) higher than the first pressure ($P_1$), which is able to act on an actuating rod (28) of a master cylinder (13) associated with the booster (11) by way of a reaction disk (32) and which is elastically returned toward its rest position by first return means (24), of the type which comprises a control rod (38) moving in the casing (12) selectively according to an axial input force exerted forward against the action of a return force exerted on the rod (38) via second return means, of the type in which the movements of the control rod (38) are able to determine the openings and closings of at least one axial intake valve (52) which is inserted between a pressure source subjected to the pressure ($P_a$) higher than the first pressure ($P_1$) and the rear chamber (18), and of at least one axial equalizing valve (50) which is inserted between the front chamber (16) and the rear chamber (18), to actuate the moving partition (14), and of the type in which a plunger (46), passing through the moving partition (14) and secured to the end of the control rod (38), is able to act directly upon the actuating rod (28) of the master cylinder (13) by way of the reaction disk (32), characterized in that the booster (11) comprises:

a floating tubular element (76) made in one piece, inserted more or less radially between the plunger (46) and the casing (12), which is axially mobile and which is elastically returned toward the moving partition (14) via third return means, of which axially offset transverse faces (78, 80) have first sealing elements (82, 84) for the axial intake and equalizing valves (50, 52), a complementary transverse second sealing element (86) for the axial intake valve (52), borne by the rear end of the plunger (46), a complementary transverse second sealing element (88) for the axial equalizing valve (50), placed on at least one portion of the rear face (90) of the moving partition (14), and characterized in that the rear end (45) of the plunger (46) comprises a rear cup (49) which comprises the complementary transverse second sealing element (86) for the axial intake valve (52) and in that the plunger (45) has, passing through it, an independent front pin (51) which has the ends of two concentric springs (40, 122) bearing against it, of which springs a first (40), the other end of which bears against the moving partition (14), forms the second return means associated with the control rod (38), and the second (122), of which the other end bears against a stepped face (136) of the tubular element (76), forms the third return means associated with the said tubular element (76) and allows it to be urged to close the equalizing valve (50).

2. The pneumatic booster (11) according to claim 1, characterized in that the floating tubular element (76) comprises:

a front tubular section (100), which is mounted with sealing around a tubular bearing surface (98) of the moving partition (14) which slideably houses the plunger (46), of which the front end (102), bearing the first sealing element (84) for the equalizing valve, facing the second sealing element (88) for the equalizing valve (50) borne by the moving partition (14), is arranged radially externally with respect to at least one communication drilling (106) passing through the partition (14), and of which a rear part communicates with the rear chamber (18), a rear tubular section (108), of a diameter smaller than the diameter of the front section (94), which is slideably guided with sealing in a rear tubular section (109) of the casing (12), which forms an intake duct fed by the source of pressure subjected to the pressure ($P_a$) greater than the first pressure ($P_1$) and of which a front transverse face (78) for connection with the front section bears the first sealing element (82) for the intake valve (52) facing the cup (49) of the plunger (46).

3. The pneumatic booster (11) according to claim 2, characterized in that the tubular bearing surface (98) of the moving partition (14) which houses the plunger (46) is formed integrally with the said moving partition (14), and in that it has a bore (99) in which the plunger (46) is housed and which opens opposite the reaction disk (32).

4. The pneumatic booster (11) according to claim 2, characterized in that the moving partition (14), the floating tubular element (76), the cup (49) secured to the plunger (46) are produced using cutting and pressing methods.

5. The pneumatic booster (11) according to claim 2, characterized in that the first spring (40) is arranged externally with respect to the second spring (122).

6. The pneumatic booster (11) according to claim 5, characterized in that the pin (51) has the rear end of a tubular bushing (130) for holding the first and second springs (40, 122) bearing against it, in that the first spring (40) is inserted between a front stepped face (132) of the bushing (130) and the moving partition (14), and in that the second spring (122) is inserted between a front end face (134) of the tubular bushing (130) and a stepped transverse face of the tubular element, particularly a rear face (136) of the front end flange (102) of the front section (100).

7. The pneumatic booster (11) according to claims 2, characterized in that the rear section (108) of the tubular element (76) is mounted with sealing in the rear section (109) of the casing (12) via a lip seal (113).

8. The pneumatic booster (11) according to claim 1, characterized in that:

the first sealing element (84) for the equalizing valve (50) consists of a seal borne by a flange formed at the end (102) of the front section (100) of the floating tubular element (76), the second sealing element (88) for the equalizing valve (50) consists of a portion of the rear face (90) of the moving partition (14), the first sealing element (82) for the intake valve (52) consists of the transverse face (78) joining the front (100) and rear (108) portions of the floating tubular element (76), the second sealing element (86) for the intake valve (52) consists of a seal borne by a flange (87) of the cup (49) secured to the plunger (46).

9. The pneumatic booster (11) according to claim 8, characterized in that the tubular bearing surface (98) for guidance of the plunger (46), which surface is borne by the moving partition (14), extends axially from the rear face (90) of the moving partition (14), and in that the moving partition (14) comprises a plurality of drillings (106) distributed angularly across the transverse partition (14) about the site where its tubular bearing surface (98) meets its rear face (90).

* * * * *